United States Patent
Wiedemann et al.

(10) Patent No.: US 7,301,117 B2
(45) Date of Patent: Nov. 27, 2007

(54) PROCESS AND DEVICE FOR CONTROLLING THE PRESSING FORCE OF AN ELECTRODE HOLDER

(75) Inventors: Günther Wiedemann, Gersthofen (DE); Franz Pecher, Augsburg (DE)

(73) Assignee: KUKA Roboter GmbH (DE)

( * ) Notice: Subject to any disclaimer, the term of this patent is extended or adjusted under 35 U.S.C. 154(b) by 448 days.

(21) Appl. No.: 10/920,937

(22) Filed: Aug. 18, 2004

(65) Prior Publication Data

US 2005/0082340 A1 Apr. 21, 2005

(30) Foreign Application Priority Data

Aug. 20, 2003 (DE) ................. 103 38 176

(51) Int. Cl.
B23K 11/10 (2006.01)
(52) U.S. Cl. .................................. 219/86.51
(58) Field of Classification Search ............ 219/86.51, 219/109, 86.41
See application file for complete search history.

(56) References Cited

U.S. PATENT DOCUMENTS 5,981,898 A 11/1999 Yamaguchi
6,313,427 B1 * 11/2001 Suita .................... 219/109
2003/0132201 A1 7/2003 Kaeseler et al.

FOREIGN PATENT DOCUMENTS

| DE | 44 32 573 | 4/1995 |
|---|---|---|
| DE | 199 48 043 | 4/2001 |
| DE | 100 05 963 | 8/2001 |
| EP | 1 088 614 A1 | 4/2001 |
| JP | 05261558 A | 10/1993 |
| JP | 10094882 A | 4/1998 |
| WO | WO 03/008145 | 1/2003 |

* cited by examiner

Primary Examiner—Clifford C. Shaw
(74) Attorney, Agent, or Firm—McGlew and Tuttle, P.C.

(57) ABSTRACT

A process and a device for controlling the pressing force of the electrodes [of an] electrode holder driven by means of an electric motor, especially of an industrial robot, during the welding operation characterized in that the motor position is controlled or that a means for controlling the position of the electric motor is provided.

29 Claims, 7 Drawing Sheets

PROCESS AND DEVICE FOR CONTROLLING THE PRESSING FORCE OF AN ELECTRODE HOLDER

The present invention pertains to a process and a device for controlling the pressing force of the electrodes of an electrode holder driven by an electric motor, especially of an industrial robot, during a welding operation.

Electrode holders for spot welding used to be driven exclusively by pneumatic or hydraulic actuators. The need to provide the power medium, usually oil, and the contamination by same, which is associated with it, are disadvantageous. Neither a controlled closing nor a soft touchdown of the electrodes on the sheet metals to be welded together was possible. The course of the power was not controllable. Electric drives were used to a greater extent to eliminate this problem. A corresponding servo drive usually comprises a brushless d.c. motor followed by a high-ratio reducing gear, which usually has a linear drive with a ball roller spindle. Such drives can be used to equip and retrofit existing electrode holder mechanisms. The electrode holder servo drive may be operated as an auxiliary axle for the motor and integrated in the robot control, which makes possible the consistent operation and programming, synchronous closing and opening of the electrode holder as well as the controlled build-up of the force and for control. The electrode holder drive is actuated in a position-controlled manner during the closing and opening. The welding force and the control or regulation of this welding force are built up until the end of the welding operation in the closed state, i.e., when the electrodes are in contact with the sheet metal.

The welding force is usually applied in torque operation, during which a motor current corresponding to the desired electrode force is present to apply a desired electrode force in order to attain a defined motor torque. This can be achieved by moving to a virtual point in the sheet metal. Since the electrodes move only minimally after coming into contact with the sheet metal surface, the manipulated variable (motor torque or motor current) sent by the speed controller of the motor control is involved in the limitation because of the PI characteristic of the controller. If the limitation is implemented at the target value of the corresponding electrodes, the desired electrode force shall automatically become established in the closed state of the electrode holder. The electrode force thus generated corresponds to the motor current generated only conditionally because of bearing frictions, stick-slip effects, friction, self-locking and breakaway forces in the gear mechanism. Furthermore, rises in the material temperature and aging effects have an unfavorable effect. Jamming of the mechanism is seen in case of stronger forces during operation. In case of a hard touchdown of the electrodes on the sheet metal and the resulting strong decelerating forces, this leads to an instantaneous increase in the electrode force, which will persist as a consequence of the existing jamming of the mechanism. The errors in force thus generated can be reduced partially only by complicated and frequent calibration measures. Another problem is that the electrode holder mechanism does not respond in the jammed state to small changes in the motor torque and reaches the breakaway forces and correspondingly performs a jerky movement only in case of considerable changes. All this is seen during the movement down a force step in the torque operation in that the electrode forces are subject to a great dispersion and follow changes in the current only insufficiently. Since the accuracy of the electrode force that is thus achieved is often insufficient because of the higher percentages of friction in the mechanical system, hardware solutions that form a control circuit by means of a force sensor with the motor current as the manipulated variable are known in practice. This requires special frequency converters, which cannot be integrated in an existing robot control. In particular, the switching over between position-and-speed control (during the opening and closing of the electrode holder) and the force-motor current control (during the application of the welding force) causes considerable problems, because these cannot be synchronized in time with the path of the robot and, in particular, they cannot be performed during a movement.

The basic object of the present invention is to provide a process and a device for controlling the pressing force of an electrode holder, by means of which [process and device] the desired pressing force can be achieved with high accuracy, while avoiding the above-mentioned drawbacks.

The object is accomplished according to the present invention with a process of the type described in the introduction, which is characterized in that the pressing force is controlled by controlling the motor position.

To accomplish the object, the present invention provides, furthermore, for a device of this class, which has a control means for controlling the motor position.

Contrary to the state of the art, the electrode holder force is controlled or regulated according to the present invention on the basis of the motor position, taking into account the spring rate of the electrode holder mechanism, rather than by controlling or regulating the motor current. The relationship between the motor position, which is measured in the known manner via an integrated resolver or incremental transducer, and the resulting electrode force has proved to be approximately linear and approximately corresponds to the spring rate of the electrode holder. The ratio of the forces determined at the electrode holder by means of an integrated force sensor to the forces actually applied to the electrode caps, which forces can be measured within the framework of a calibration operation, also proved to be greatly linear. Consequently, the present invention contains a control and a control device for the electrode holder force with a control circuit, wherein the controlled variable is the electrode holder force and the manipulated variable is the motor position, rather than the motor current, as in the state of the art.

Provisions are made in a preferred embodiment of the process according to the present invention for the motor position to be measured by means of at least one resolver or incremental transducer integrated in the electric motor. The device according to the present invention is characterized for this purpose by a resolver integrated in the motor for measuring the motor position. Provisions are made in a variant for the force applied to be determined by means of a force sensor at the electrode holder and for the actual force measured at the electrode holder to be compared with a desired set point of the force and for a deviation to be thus determined, from which a manipulated variable is derived for the motor position, while the pressing force being able to be measured, in principle, directly at the electrodes; however, since the EMV may cause problems, provisions are preferably made in the present invention for the pressing force to be determined by means of sensors at a point of the electrode holder located at a distance from the electrodes. Provisions are made in this connection in a preferred embodiment for determining a path variable (path, path increment) from the manipulated variable of a force transducer and the intended spring rate of the electrode holder and subsequently subjecting the path variable determined to further processing by means of a speed control.

While provisions are made in another preferred embodiment of the process according to the present invention for the pressing force to be determined by means of a wire strain gauge at the electrode holder, an extremely preferred embodiment is characterized in that the pressing force is determined by means of sensors at a point of the electrode holder located at a distance from the electrodes.

To determine the force applied at the electrode holder, provisions are made in a variant for the pressing force to be determined by means of sensors at a point of the electrode holder located at a distance from the electrodes, in which case the pressing force is determined, in particular, by means of wire strain gauges at the electrode holder and/or the welding force is determined in a bridge circuit by wire strain gauges at the electrode holder.

Thus, the device according to the present invention is designed in a variant such that the measuring means are formed by wire strain gauges, wherein wire strain gauges are arranged at electrode holder arms or at least one wire strain gauge is arranged at a lever connecting the motor with the electrode holder arm rigidly connected with same.

Provisions are made in another preferred embodiment of the device according to the present invention for wire strain gauges to be connected as a measuring bridge. Moreover, a means for processing and isolating the force signal measured by the force sensor may be provided in a variant according to the present invention.

Other preferred embodiment[s] of the device according to the present invention are characterized [by] a converter for converting the measured force signals into a digitized force actual value, where a conversion unit is provided, in particular, for converting the measured and optionally digitized force actual value signals into a physical electrode holder force and/or a comparison means (34, 35) is provided for comparing the measured physical actual force and the desired set point of the force to determine a deviation and manipulated variables.

Other embodiments of the device according to the present invention are characterized by a conversion unit for converting the force manipulated variable into a displacement path (ΔF-Δs) of the electric motor, where, in particular, especially a comparison means for comparing the position set point with an actual position detected at the motor and especially a position controller for controlling the position of the electric motor [are provided]. The force controller of the position controller operates according to the present invention. It would also be possible to use the force controller upstream of the load controller.

Provisions are made in another preferred embodiment of the process according to the present invention for a calibration of the ratios of the electrode holder force to the path and/or of the sensor value to the electrode holder force, which calibration corresponds to the spring rate, to be performed.

Other advantages and features of the present invention appear from the claims and the following description, in which an exemplary embodiment of the present invention is explained in greater detail in reference to the drawings. In the drawings.

The present invention pertains to the control of the pressing force of an electrode holder driven by means of an electric motor by controlling the position of the electric motor.

Figure 1:
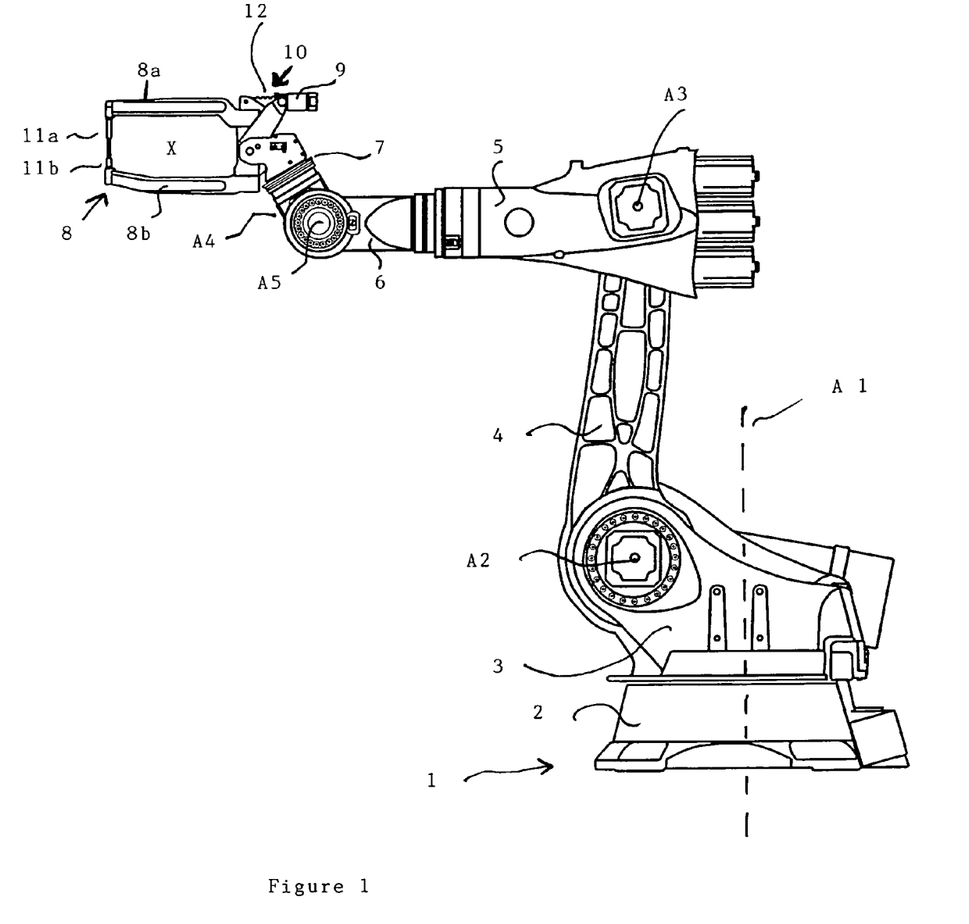
FIG. 1 shows a six-axis industrial robot provided on its hand with an electrode holder X.

FIG. 1 shows a conventional industrial robot 1 with a base 2, a carousel rotatable around the first axis of the robot 1, namely, the vertical axis A1, a robot rocker 4 pivotable around the second axis, namely, the horizontal axis A2, and a robot arm 5 articulated pivotably to same around the third axis, namely, the horizontal axis A3. The robot hand 6, which comprises elements pivotable around three axes A4 through A6, is fastened to the robot arm 5. An electrode holder X 8, whose two electrode arms 8a, 8b are pivotable around X in relation to one another under the drive of a spindle drive 10 having a electrode holder main motor 9 and whose pin electrodes 11a, 11b can thus be pressed against parts to be welded together, is fastened to the hand flange 7 of the robot hand 6. The electrode holder main motor 9 is connected with the electrode arm 8b, and the free end of the spindle 12 with the electrode arm 8a.

Figure 2:
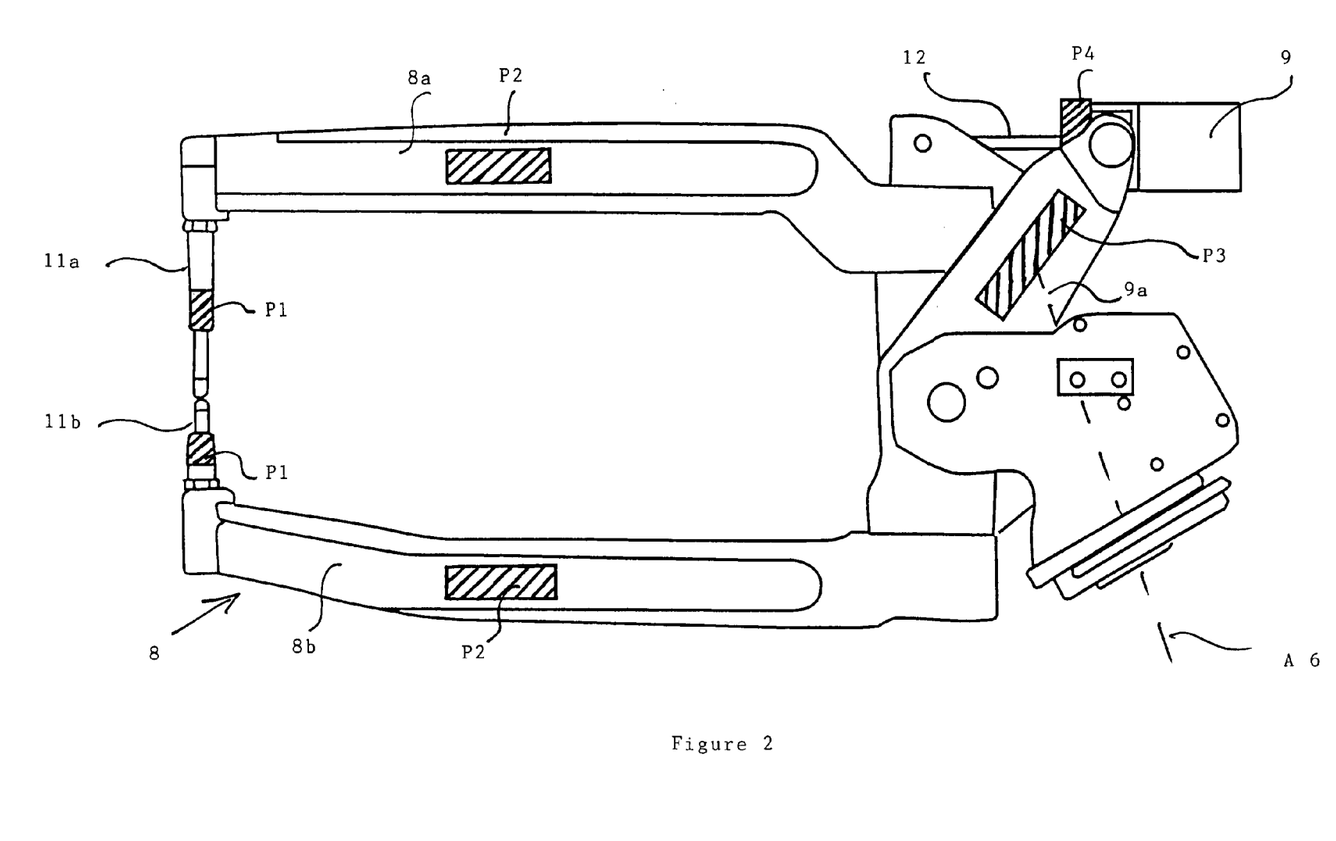
FIG. 2 shows the electrode holder according to FIG. 1 in an enlarged view with positions for arranging pressure sensors.

The electrode holder 8 is shown in an enlarged view in FIG. 2. Furthermore, FIG. 2 shows positions P1, P2, P3, P4 for the arrangement of pressure sensors.

The positions P1 are located in the area of the electrodes 11a, 11b and measure directly the pressure applied to same. The positions P2 are located at the electrode arms and measure, the bending of same, which is due to the electrodes 11a, 11b pressed against one another. The position P3 is located at a connecting lever 9a connecting the fastening point of the electric motor 9 and can consequently measure the bending thereof when pressure is applied to the electrodes 11a, 11b. A piezoelectric sensor for measuring the pressing force is located at P4. This sensor is preferably integrated in the electrode holder main motor.

The manner and location of the force measurement is not essential. The selection of the sensor and of the site at which it is installed is affected by the mechanical conditions of the electrode holder and the suitability of the sensor. Therefore, further improvements may decisively affect the selection of the sensor and of the site at which it is installed. Where the measured force value comes from is not essential for the control and is represented, for example, only as an example.

Figure 3:
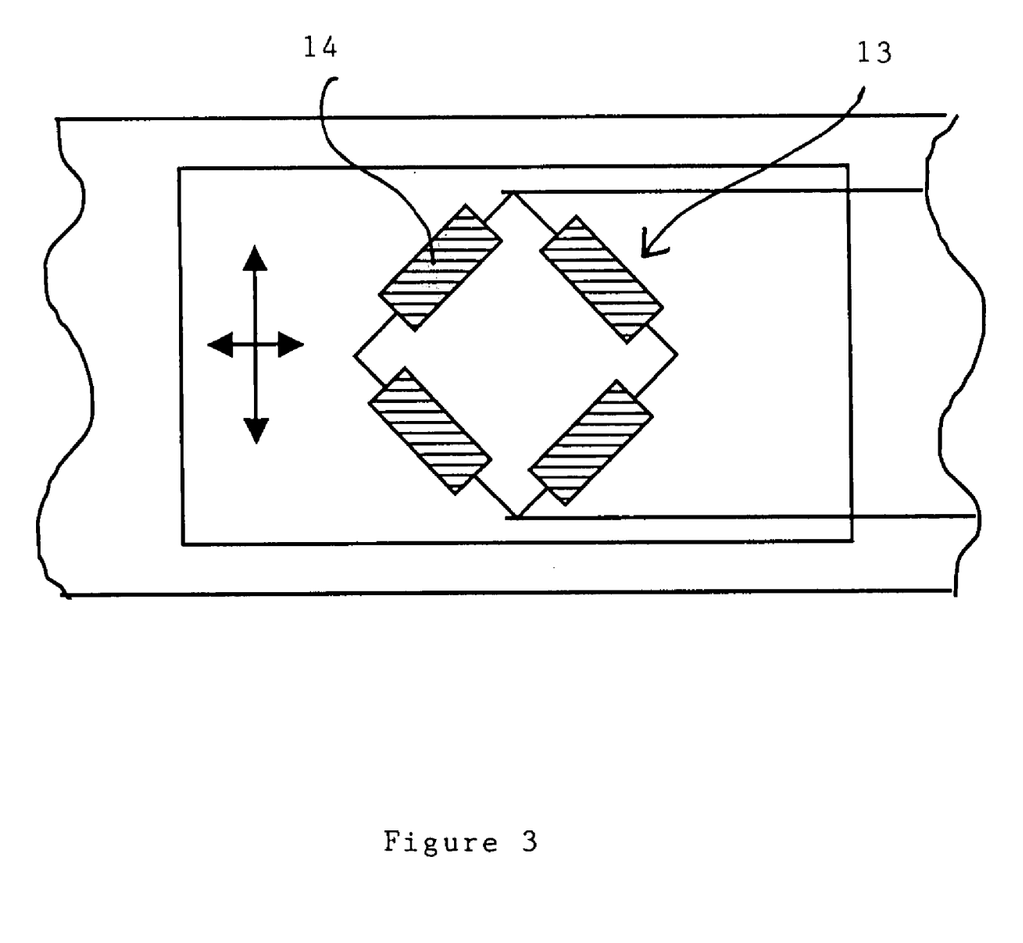
FIG. 3 shows the arrangement of wire strain gauges to form a measuring bridge as a sensor.

The pressure sensors are preferably designed as wire strain gauge measuring bridges 13 with wire strain gauges 14, where the latter are arranged in the form of a bridge circuit, as this is shown in FIG. 3.

The signal measured by the said pressure data sensors flows as an actual signal into the force-position control means of the electric motor 9 according to the present invention.

Figure 4:
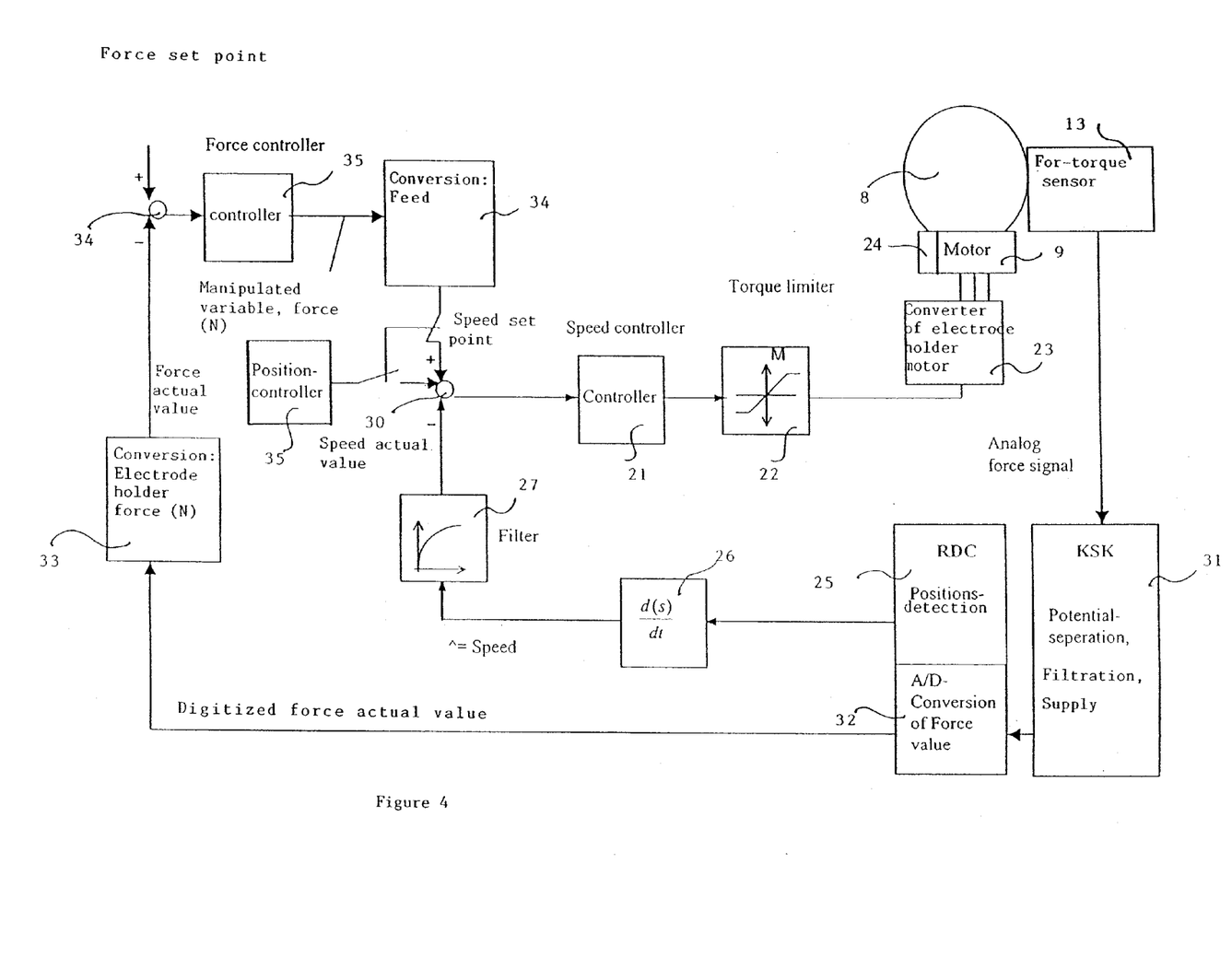
FIG. 4 shows a block diagram for the force-position control according to the present invention.
Figure 5:
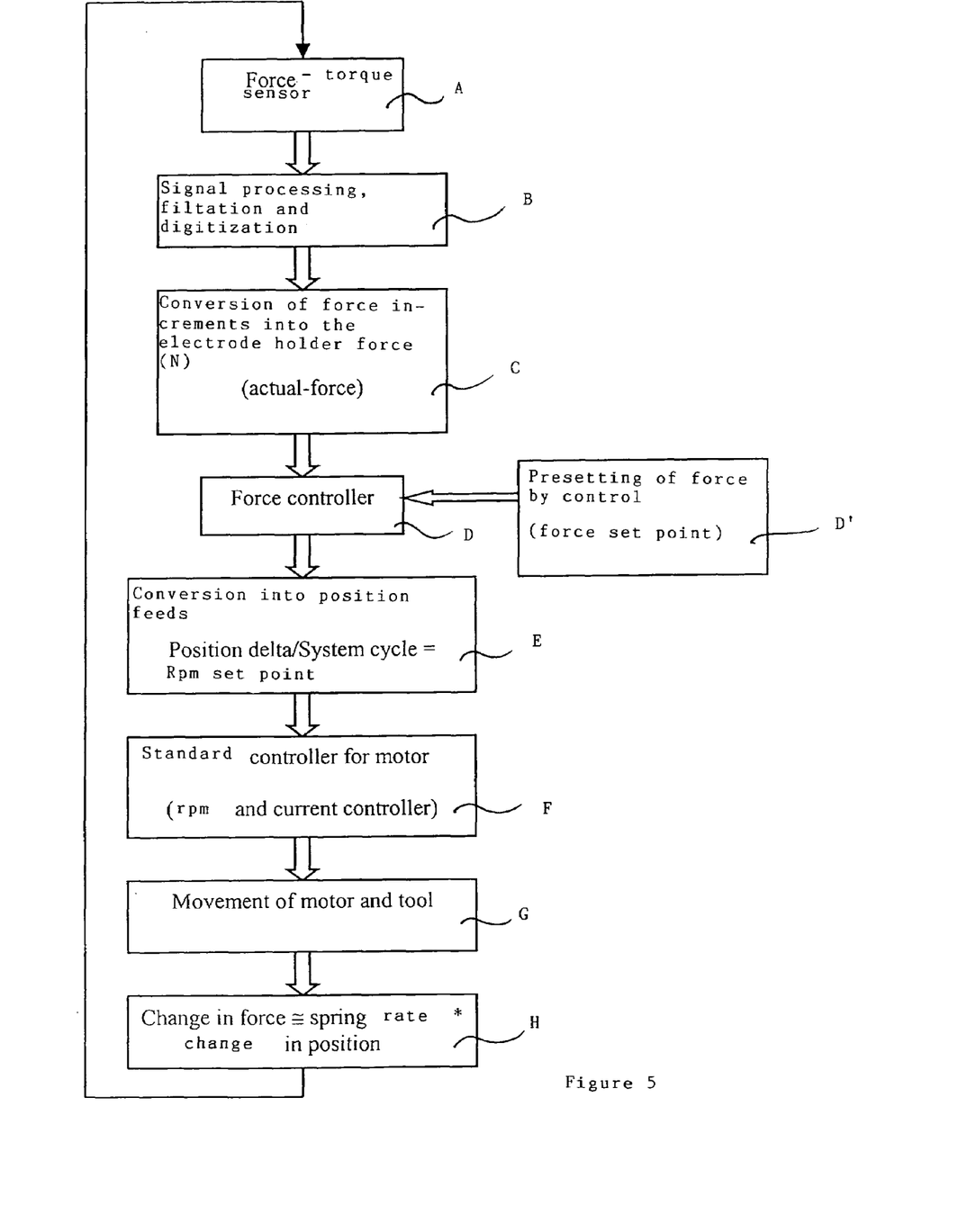
FIG. 5 shows a flow chart of the force-position control according to the present invention.

A block diagram of a device for the force-position control of the motor is shown in FIG. 4.

The electrode holder 8 shown schematically is driven by the motor 9 and has at least one force-torque sensor 13 in the above-described manner.

The control of the electric motor 9, which is an electric servomotor, has a speed controller 21, a torque limiter 22 as well as a converter 23 in the known manner.

The motor is provided with a resolver 24, which is connected with a resolver digital converter RDC 25, via which the position determination or the determination of the position of the motor 9 is performed. The actual speed of the motor 9, which is sent to a comparison unit 30 arranged upstream of the speed controller 21, is thus determined via a differentiator 26 as well as a filter 27.

The force-torque sensor 13 is connected with a force sensor card 31, in which potential separation and filtration as well as the supply of the sensor are performed. The force sensor card 31 is followed by an AD converter 32, with which the entire force actual value is digitized. This [value] is optionally sent to a conversion unit 33, in which the digitized force actual value measured, e.g., at the positions P2, P3 or P4 is converted into the actual electrode holder force between the electrodes. The conversion factor can be determined on the basis of a calibration of the force measured at the positions P2, P3 or P4 based on the force determined between the electrodes at the position P1 in a calibration operation. The converted force is sent as an actual force into a comparison unit 34, to which the desired force set point is sent as the set point. Based on the comparison, a force controller 35 generates a manipulated variable concerning the force to be applied, which is converted into a feed for the electric motor 3 in another converter 34 and is sent as a speed set point to the comparison unit 30, which generates an adjusting signal for the speed controller 21 on the basis of a comparison between the above-mentioned speed actual value at the output of the filter 27 and the speed set point of the converter 34. In normal position control operation, this [signal] includes the signal of a position controller 36 sent to the comparison unit (36).

To control the force applied to the workpiece by the electrode holder 8, an actual force is determined by means of the force-torque sensor 13 in a step A (FIG. 6), and the signal sent by the sensor is processed, filtered, and digitized (step B). The force signal, which is in the form of an increment, is subsequently converted by means of a fixed conversion factor in the conversion unit 33 into the electrode holder force in Newtons as an actual force (step C). A comparison is performed with the force set point preset by the control (step D'), and the deviation is confirmed. A manipulated variable is subsequently outputted (step D) by multiplication with a factor, such as a P factor in case of, e.g., a P controller, and this manipulated variable is in turn converted in the converter 34 into position feeds and a speed set point corresponding to the quotient of the position delta and the system cycle (step E). This speed set point is sent to the control, which is present per se (speed controller 21, torque limiter 22 and converter 23) for the motor 9 (step F), as a result of which the movement of the motor into the particular position is thus controlled (step E), and the change in the force in the electrode holder 8 is thus brought about corresponding to the spring rate given between the motor and the force-torque sensor of the electrode holder 8 as well as the change made in the position to apply the desired force. The force obtained is in turn determined and its value is optionally sent to a repeated control operation (step H).

The signal processing takes place in the time-discrete digital control of the motor position by means of speed values corresponding to the speed set point=$\Delta s$/IPO cycle ($\Delta s$=path increment; the IPO cycle is the system cycle of the computer used) corresponding to the spring rate of the electrode holder mechanism. The force controller delivers, like a conventional force controller, a manipulated variable in the form of a speed, a manipulated variable in the form of a path or position. This $\Delta s/\Delta t = v$, the speed set point for the digital speed controller, is performed/calculated once per system cycle.

Figure 6A:
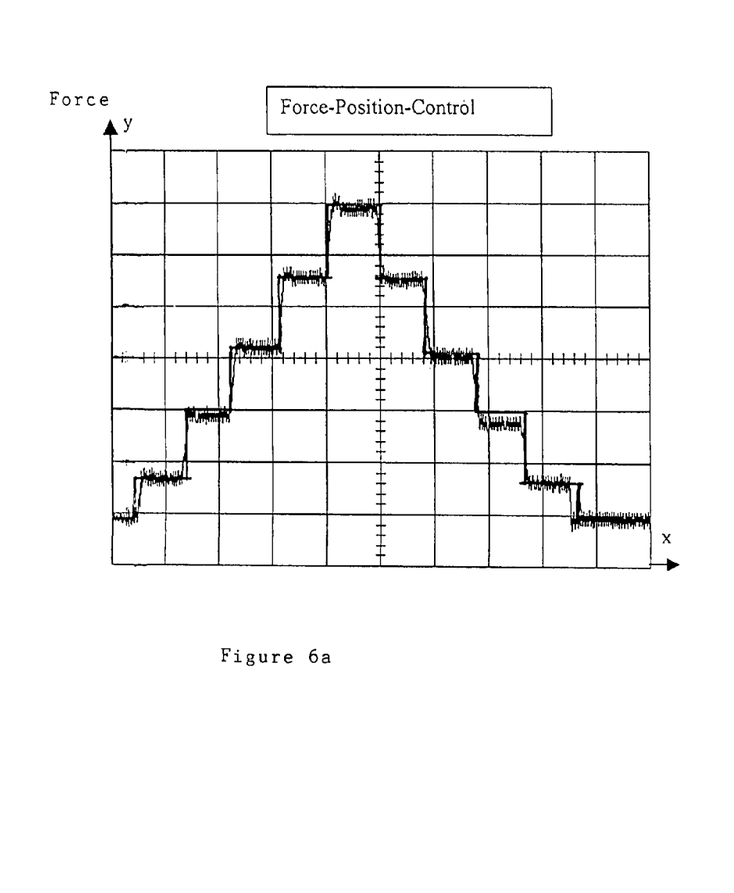
FIGS. 6a, b show a diagram showing the movement down a force step during the force position control (FIG. 7a) and conventional torque operation (FIG. 7b)
Figure 6B:
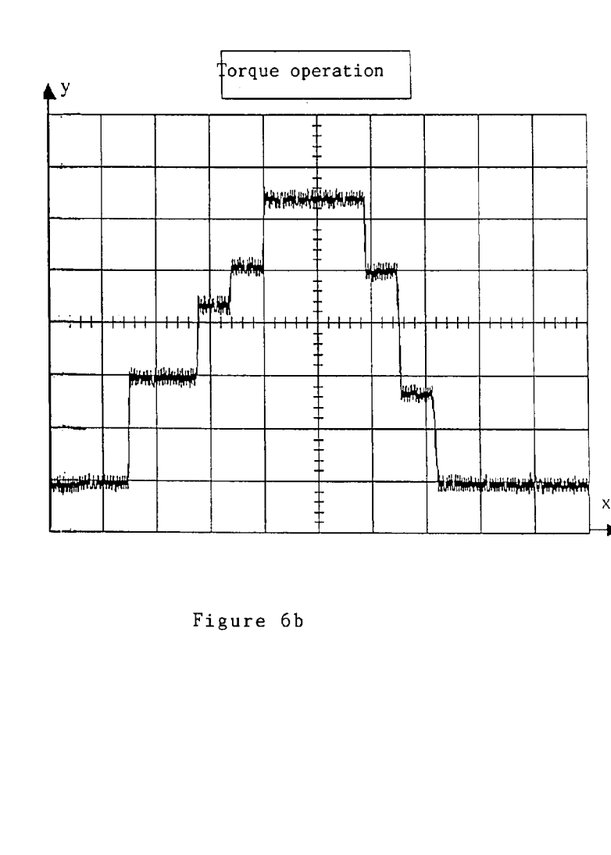

FIG. 6a shows a diagram describing the movement down a force step applied to an electrode holder with identical force steps. The signal measured by means of an external force measuring unit between the caps of an electrode holder is designated by I. The diagrams show the signal recorded by means of an oscilloscope. The signal noise which can be seen is due to EMV disturbances an the measuring line. The scales are approx. 500 Newtons per division in the Y direction and 2 second divisions in the X direction. The set point is designated by S in FIG. 6a. It is seen during the movement down this force step that the actual value and the set point agree during force-position control corresponding to the present invention FIG. 6b shows a corresponding force measurement during movement over a force step in the torque operation. The set point is not recorded here. It is seen that if only the motor current is preset, the resulting electrode forces are subject to a great dispersion and follow the changes in the current only insufficiently.

Figure 7:
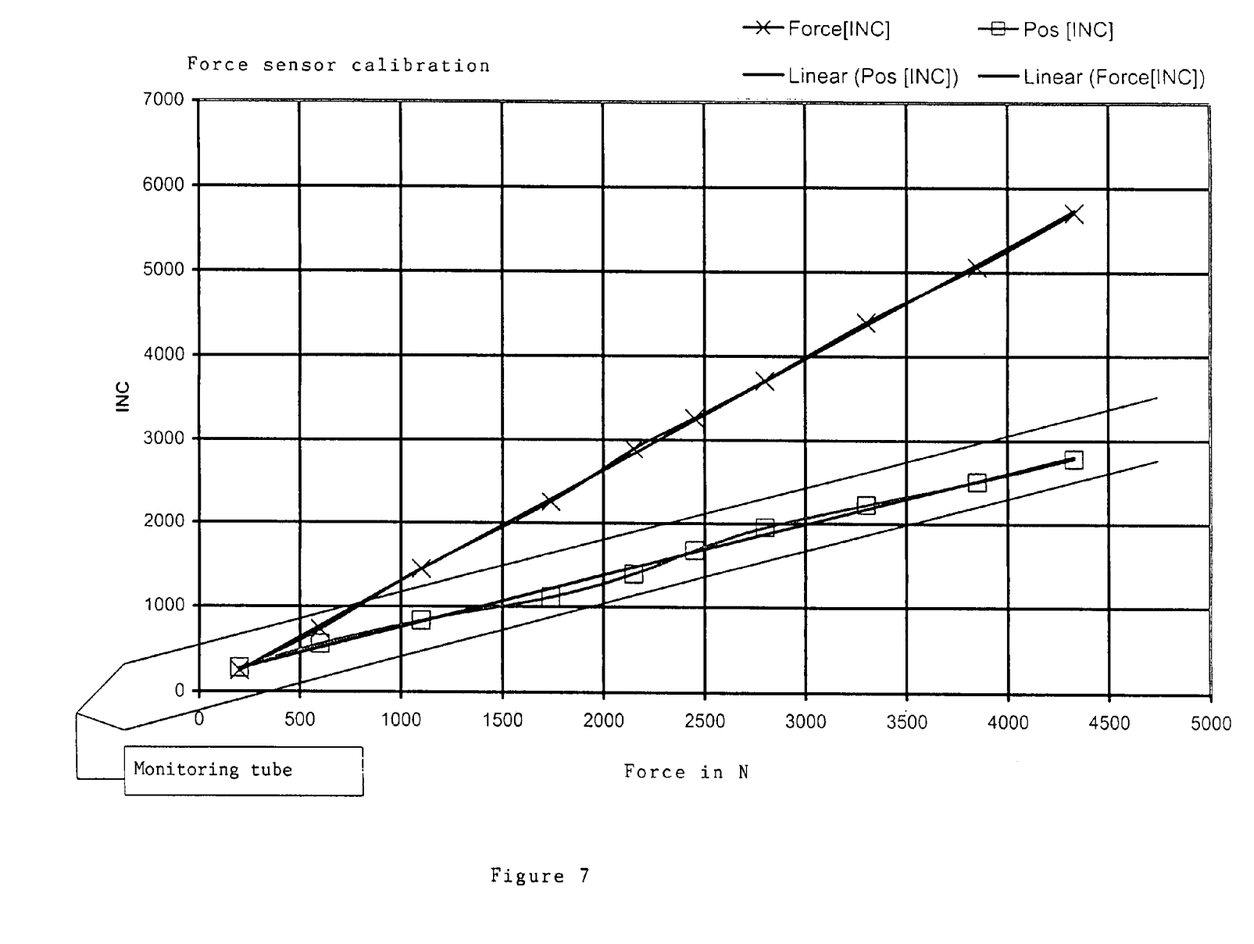
FIG. 7 shows a diagram for the calibration of the force sensor.

FIG. 7 shows the relationship between the position of the electric motor, measured by means of the integrated resolver 24, wherein the motor position is stated by increments INC, and the resulting electrode force between the electrodes (curve P), measured by a force sensor at position P1 in FIG. 2 within the framework of a calibration operation or the corresponding values of the integrated force sensor at position P4 in FIG. 2 for a plurality of points with the electrode holder stopped: Curve Q in FIG. 7.

It is seen at first that both relationships are nearly linear. The regression lines of the calibration curves of the relationships between the electrode force, the motor position and the measured value of the integrated force sensor can be calculated from the curves P and Q in the usual manner. The force sensor values can be converted into Newtons and the latter into position changes by means of the parameters of these regression lines. As is shown, the relationships are nearly linear. Should they not be linear, an approximation is conceivable by position lines, splines or any other functions.

The relationship between the electrode holder force and the motor position, which relationship is known after the calibration, also makes possible—contrary to the torque control and/or regulation, the evaluation of these data for monitoring purposes. It is possible to check, for example, whether the current position is also proportionate to the actual force present within a predetermined tolerance range (monitoring tube S in FIG. 7). This checking may be performed, as in a lag error monitoring of the robot control, permanently or cyclically, and not only when the target force is reached. It is thus always guaranteed that the power plants values determined are also true, i.e., that the hardware is functioning properly.

The force and position values can be stored for this purpose during the switchover between position and force control and the changes in the positions can be compared with one another. If the corresponding values do not match each other, it can be inferred from this that either is the calibration incorrect, the sensor is defective and the signal chain is interrupted, or that the sensor was initialized incorrectly. This is of particular significance in case of the use of piezo sensors, whose evaluating unit must receive a reset signal at zero force in order to prevent the measured value from drifting away.

The evaluation of the course of the electrode force and the motor position during the welding operation proper also yields information on the quality of the welding spot generated. The electrode holder must move during the welding as the material to be welded melts, i.e., it must adapt its position to the compressed welding spot, while the electrode force is maintained. This happens due to the elasticity of the electrode holder mechanism, on the one hand, and likewise due to the control of the electrode force, on the other hand.

The invention claimed is:

1. A process comprising:
   sensing actual pressing force of electrodes of an electrode holder driven via an electric motor;
   comparing said actual pressing force with a predetermined pressing force;
   controlling the pressing force of the electrodes based on difference between said actual pressing force and said predetermined pressing force via said electric motor, whereby the pressing force is controlled by controlling the motor position.

2. Process in accordance with claim 1, wherein the motor position is measured by means of at least one resolver integrated in the electric motor.

3. Process in accordance with claim 1, wherein the force applied is determined by means of a force sensor at a wire strain gauge.

4. Process in accordance with claim 1, wherein the actual pressing force measured at the electrode holder is compared with a desired force set point, and a deviation, from which a manipulated variable for the motor position is derived, is thus determined.

5. Process in accordance with claim 1, wherein a path variable is determined from the manipulated variable of a force control and the intention of the spring rate of the electrode holder.

6. Process in accordance with claim 5, wherein the path variable determined is subjected to further processing by means of a speed control.

7. Process in accordance with claim 6, wherein the welding force is determined in a bridge circuit of wire strain gauges at the electrode holder.

8. Process in accordance with claim 1, wherein the pressing force is determined by means of a sensor at a site of the electrode holder located at a distance from the electrodes.

9. Process in accordance with claim 1, wherein the pressing force is determined by means of wire strain gauges at the electrode holder.

10. Process in accordance with claim 1, wherein calibration of the ratios of the electrode holder force to the path and/or of the sensor path to the electrode holder force is performed.

11. A device comprising:
    an electric motor;
    an electrode holder having electrodes, said electrode holder being driven via said electric motor; and
    a control means including a force controller, said force controller generating an input force value for controlling the position of the electric motor.

12. Device in accordance with claim 11, wherein a resolver is integrated in the motor for measuring the motor position.

13. Device in accordance with claim 11, further comprising an incremental transducer for determining the position.

14. Device in accordance with claim 11, further comprising measuring means at said electrode holder for measuring welding forces applied by the electrode holder (8).

15. Device in accordance with claim 14, wherein said measuring means are formed by piezoelectric pressure/strain sensors.

16. Device in accordance with claim 14, wherein said measuring means are formed by wire strain gauges.

17. Device in accordance with claim 16, wherein at least one said wire strain gauge is arranged at a lever connecting the motor with the electrode holder arm connected therewith rigidly.

18. Device in accordance with claim 14, wherein wire strain gauges/sensors are arranged at said electrode holder arms or at the said motor.

19. Device in accordance with claim 14, wherein said wire strain gauges are connected as a measuring bridge.

20. Device in accordance with claim 11, further comprising a means for processing and isolating the force signal measured by a force sensor.

21. Device in accordance with claim 11, further comprising a converter for converting the measured force signal into a digitized force actual value.

22. Device in accordance with claim 11, further comprising a conversion unit for converting the optionally digitized force actual value signal measured into a physical electrode holder force.

23. Device in accordance with claim 11, further comprising a comparison means for comparing the measured physical actual value and the desired force set point to determine a deviation and a manipulated variable.

24. Device in accordance with claim 11, further comprising a conversion unit for converting the force manipulated variable into a path of displacement of the electric motor.

25. Device in accordance with claim 11, further comprising a comparison means for comparing the position set point with an actual position determined at the motor.

26. Device in accordance with claim 11, further comprising a comparison means for comparing the motor speed set point with the motor speed actual value.

27. Device in accordance with claim 11, further comprising a comparison means for comparing the motor current set point with the motor current actual value.

28. Device in accordance with claim 11, further comprising a position controller for controlling the position of the said electric motor.

29. A process comprising:
    providing a plurality of pressure sensors;
    providing an electrode holder;
    arranging each pressure sensor on said electrode;
    measuring actual pressing pressure of said electrode holder with said pressure sensors;
    providing an electric motor;
    determining a relationship between position of said electric motor and pressing force based on a comparison of said actual pressing pressure with a predetermined pressing force;
    directly controlling the pressing force of said electrode holder by controlling the position of said electric motor, whereby said electric motor actuates said electrode holder.

* * * * *